8172X

J. A. & H. A. Pitt

Chain Pump,

Patented Apr. 28, 1834.

N. PETERS, PHOTO-LITHOGRAPHER, WASHINGTON, D. C.

John A. Pitts & Hiram A Pitts

Pitts endless chain Rotary Pump

The schedule referred to in these Letters Patent and making part of the same, containing a description in the words of the said John A. Pitts & Hiram A Pitts themselves of their improvement in the endless chain pump, called Pitts's endless chain rotary Pump.

To all to whom these Presents shall come;

Be it known, that We, John A. Pitts ~~and Hiram A Pitts~~ of Winthrop, county of Kennebec and state of Maine, and Hiram A Pitts of Livermore, Co. of Oxford and State of Maine, have invented a new and useful improvement in the endless chain Pump, and that the following is a full and exact description of the construction and operation of the said improvement as invented by us ——

If the pumpstock is to be made anew, we bore a log in the usual way, then ream it out with a large augur, to within two or two and a half feet of the bottom, or we take two pieces of Plank and joint them so as to fit perfectly, then make a groove in each, with a half round tool; This bore may be made as in the other instance, larger than the tube or bore is within two and a half feet of the bottom - If an old pumpstock of the common kind is to be used, we put in a tube of a smaller bore than the first or former one was, two and a half or three feet long. —

We then make a common flat link band chain and connect the two ends, and thus make an endless band - We next take pieces of wood turned round or cylindrical, nearly of the size of the small bore of the pump - These we have, say two inches long - We then take a saw of the thickness of the flat links of our chain and saw the plug or piston nearly in two longitudinally we then insert one of the flat links and put a screw through the whole, thereby fastening the plug or piston to the chain. These plugs are put upon the chain at every two, or two and a half feet. Upon the top and bottom of each piston we fasten, by nailing or otherwise circular pieces of leather of the same diameter as the small bore of the Pumpstock; this makes them fit snug— We also make our pistons of cast iron, casting them around the flat link and turning or filing them smooth— We also for some purposes fasten the piston to the chain by applying one side of the piston to the flat link— This enables us to take water very near the bottom of the well or reservoir—

Having prepared our chain and pistons, we attach a Cog-wheel with a crank to the top of the pump, and another Cogwheel at the bottom, over which the chain passes— A shoe or trough is fastened to the bottom of the pump just below the lower wheel which prevents the water from becoming turbid or muddy by the action of the chain Reference to the drawings—

Figure 4:
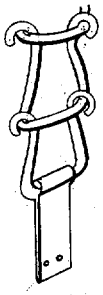
Figure 2:
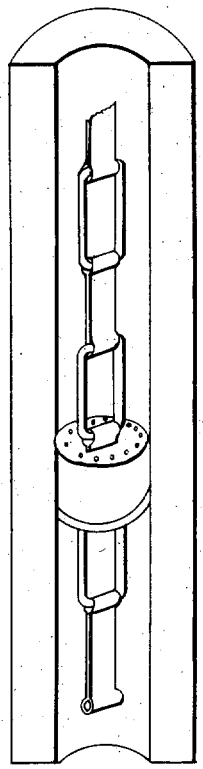
Figure 3:
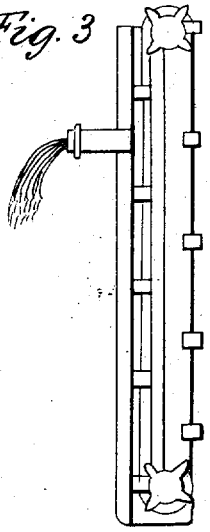
Figure 1:
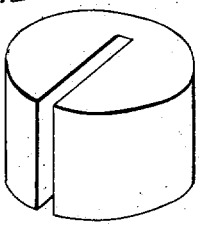

Fig. 1 shows the form of the piston or plug, with the saw cut in it. Fig. 2 shows a longitudinal section of the pump with one of the pistons and a piece of the chain— Fig. 3. Is a linear view of the whole construction— Fig. 4. Shows a method of making the chains which we sometimes adopt— Pieces of wire are bent in the form of a [illegible] with loops in the ends which twist round and hold the next link; whenever a flat link occurs these loops twist into holes in the ends of said flat link—

Claims— What we specifically claim as our improvement and for which we ask an exclusive right is— 1) The application of the flat link chains and cog wheels, also the wire chain as above specified— 2) Our modes of making or filling and attaching the plugs or pistons of wood or cast iron as above specified— 3) Our mode of filling an old common pump stock for the application of our flat link chain and pistons as above specified NB To prevent freezing, a box might be fitted over the pump in winter and confine the air around it, In testimony that the above is a true specification of our said improvement, as above described, we have hereto set our hands this fifth day of April in the year of our Lord One Thousand Eight Hundred and Thirty four Witnesses Saml. P. Benson — John A. Pitts E. Holmes — Hiram A. Pitts Drawing 775 acres Exd